United States Patent [19]

Hattori

[11] Patent Number: 4,665,493

[45] Date of Patent: May 12, 1987

[54] MACHINING APPARATUS

[75] Inventor: Shinichi Hattori, Nagasaki, Japan

[73] Assignee: Mitsubishi Denki Kabushiki Kaisha, Tokyo, Japan

[21] Appl. No.: 647,460

[22] Filed: Sep. 5, 1984

[30] Foreign Application Priority Data

Sep. 5, 1983 [JP] Japan .................. 58-164378

[51] Int. Cl.⁴ .................. G06F 15/46; G05B 19/18; G05B 19/25; B25J 9/00

[52] U.S. Cl. .................. 364/474; 364/167; 364/475; 318/573; 318/601; 901/3

[58] Field of Search .............. 364/474, 475, 167, 169, 364/170, 573; 318/600, 601, 603, 573, 569; 901/3, 5, 6

[56] References Cited

U.S. PATENT DOCUMENTS

| | | | |
|---|---|---|---|
| 3,917,930 | 11/1975 | Davey et al. | 364/167 |
| 4,016,396 | 4/1977 | Hassan et al. | 318/601 |
| 4,259,627 | 3/1981 | Matsuno et al. | 318/600 |
| 4,488,242 | 12/1984 | Tabata et al. | 364/513 |
| 4,523,287 | 6/1985 | Kogawa | 364/169 |
| 4,527,244 | 7/1985 | Graham, Jr. | 384/474 |
| 4,535,414 | 8/1985 | Lemelson | 364/474 |
| 4,541,060 | 9/1985 | Kogawa | 318/573 X |
| 4,541,062 | 9/1985 | Kada et al. | 901/3 X |
| 4,542,467 | 9/1985 | McMurtry | 364/167 |
| 4,615,149 | 10/1986 | Yoneda et al. | 364/474 X |

FOREIGN PATENT DOCUMENTS 56-14308 2/1981 Japan .
56-11510 2/1981 Japan .

Primary Examiner—Joseph Ruggiero
Assistant Examiner—Jon D. Grossman
Attorney, Agent, or Firm—Leydig, Voit & Mayer

[57] ABSTRACT

This invention relates to a machining apparatus for repeating the position and the attitude of a desired point on a work, memorizing as a plurality of data in a memory device, and automatically operating a jig from the stored point to the stored point in accordance with calculated result of a calculator for calculating to interpolate between these points while a machining head remains stationary. The device comprises a detector for teaching the position and the attitude of the machining head with respect to the work independently from the machining head in case of forming teaching data. A calculator is provided for calculating the spatial position and attitude entirely in the same manner as the detector with respect to the work by the stored data under playback condition so that the machining head takes with respect to the work. Also, a control unit is provided for controlling the position and the attitude of the jig in accordance with the calculated result of the calculator, and a drive unit for driving the jig on the basis of a command from the control unit.

2 Claims, 7 Drawing Figures

MACHINING APPARATUS

BACKGROUND OF THE INVENTION

FIELD OF THE INVENTION

The present invention relates to a machine tool for storing a position and an attitude of desired points on a workpiece and automatically moving a jig with respect to a stationary machining head and, more particularly, to a machine tool capable of teaching a position and an attitude of a jig to a machining head while maintaining the machining head stationary.

The conventional machine tool of this type is shown in FIG. 1 wherein 1 designates a machining head fixed to a base table and 2 a workpiece to be machined which is fixed to a jig 3. The jig 3 is constructed to change its own position and attitude in accordance with control commands from a control system 4, a driving unit 5 for driving the jig 3 in accordance with the control commands from the control system 4, and a teaching box 6 for remotely controlling the jig 3.

The operation of the machine tool will be described below. The teaching box 6 is manipulated to operate the jig 3 such that the workpiece 2 takes the position and the attitiude fixed with regard to the machining head 1 at the point to be machined. Once the position and attitude of the workpiece 2 are determined with regard to the machining head, the teaching box instructs the control system 4 to store data being representative of the position and attitude of the machining head.

The control system 4 calculates to adjust the points beforehand stored and instructs the driving unit 6 to control the jig 3 to move to the calculated positioned and attitude when the control system receives playback commands.

The conventional machine tool is constructed as stated above. Therefore, the jig has to be moved such that the workpiece may be in the adequate position and attitude with respect to the stationary machining head when the jig is provided with information representative of its position and attitude with regard to the stationary machining head. Thus, the problem arises in that it becomes difficult to position a three-dimension configuration at a machining point fixed with respect to the machining head and difficult to detemined the attitude of the three-dimension configuration in a fixed direction to the machining head and, therefore, difficult to teach the fixed point to the jig, thereby requiring much time.

SUMMARY OF THE INVENTION

The present invention eliminates the aforesaid problems and has for its object to provide a machine tool having a detector capable of detecting its own position and attitude independently from a machining head and being adapted to calculate a spatial positional relationship of the machining head with respect to the jig identical to that of the detector with the jig by the application of signals being representative of the position of the detector to the control system.

BRIEF DESCRIPTION OF THE DRAWINGS

The above and other objects and attendant advantages of the present invention will become readily apparent by reference to the following detailed description when considered in conjunction with the accompanying drawings wherein.

In the drawings, the same symbols indicate the same or corresponding parts.

Figure 1:
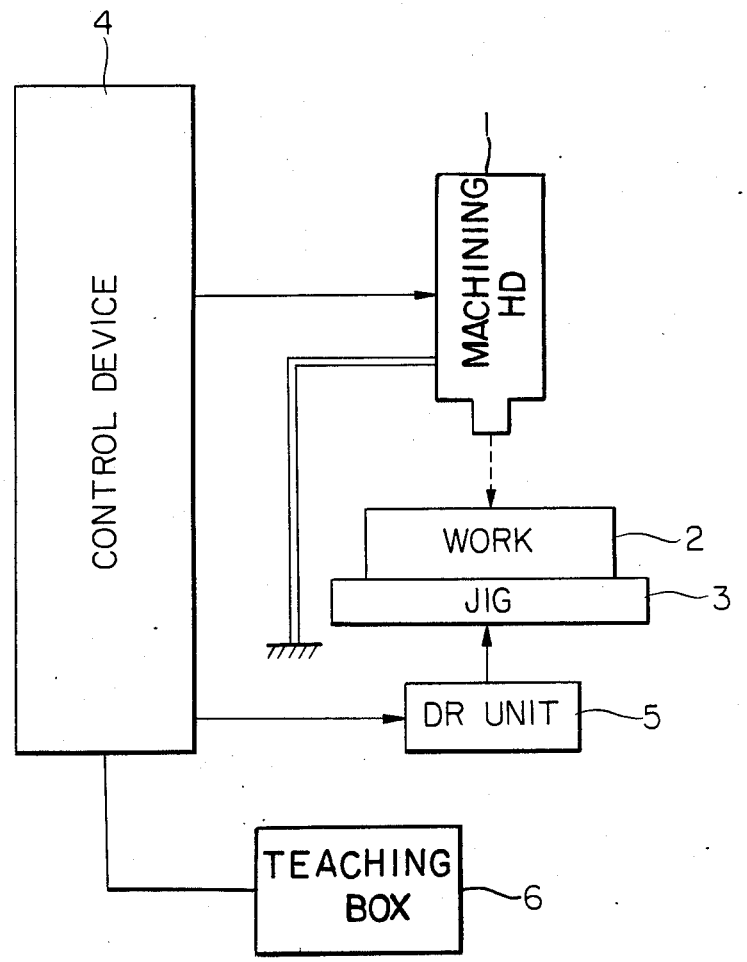
FIG. 1 is a block diagram of the system construction showing a conventional machining apparatus.
Figure 2:
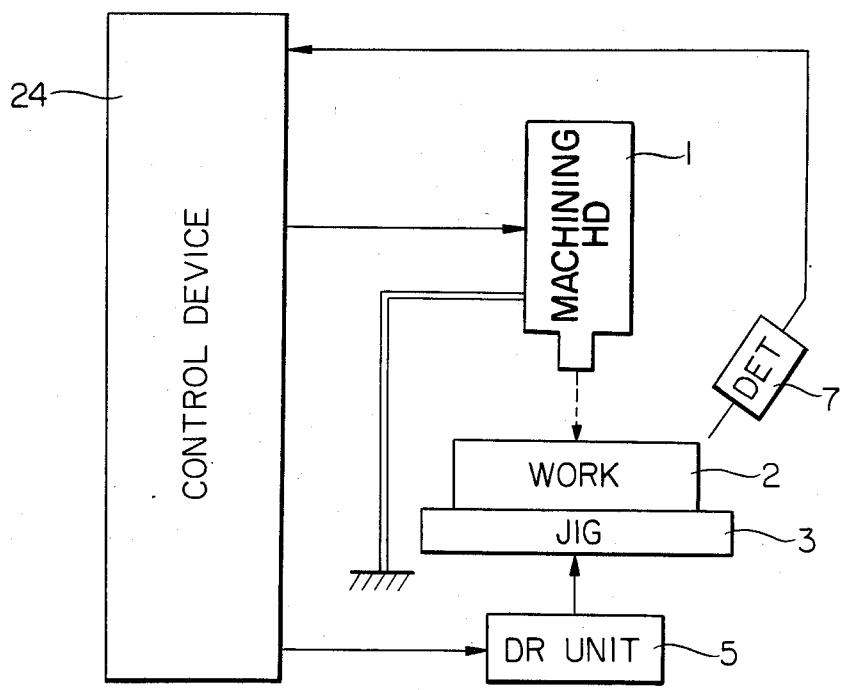
FIG. 2 is a block diagram of the system construction showing a machining apparatus constructed according to an embodiment of the present invention.

DETAILED DESCRIPTION OF THE PREFERRED EMBODIMENTS:

One embodiment of the present invention will be described below. In FIG. 2, 1 designates a machining head fixed to a base table, 2 a workpiece to be machined which is fixed to a jig 3, 5 a driving unit for driving the jig 3, 7 a movable detector capable of detecting its own position and attitude, 24 a control system provided with signals from the detector 6 for controlling the position and attitude of the jig and the machining sequence of the machining head 1 by the application of signals being representative of the position and attitude of the detector.

The operation will now be described. The movable detector 7 is first manipulated to detect the point to be machined on the workpiece 2 while maintaining the jig stationary at a predetermined position and attitude, and is then moved to a fixed position and attitude to be taken by the workpiece. Once the detector 7 is fixed to its position and attitude, the data being representative of the position and attitude thereof are inputted. The control system 24 is instructed to store the data being representative of the position $(x_n, y_n, z_n)$ and the attitude $(\alpha_n, \beta_n, \gamma_n)$ of the detector at the corresponding point n at this time in its memory every time the control system receives commands to store them. The coordinate of the position $(x_n, y_n, z_n)$ and attitude $(\alpha_n, \beta_n, \gamma_n)$ corresponds to a coordinate system represented by O/xyz at a reference point 31 of the machine tool in FIG. 3. Now, according to the three axis coordinate systems O'-x'y'z' at the reference point 32 of the detector in FIG. 3, the coordinate conversion matrix to the three axis coordinate system O-xyz at the reference point 31 of the machine tool is represented by $M_T$. Then, the coordinate conversion matrix of the detector at the point n of each of the data stored in the memory can be represented by $M_{Tn}$. In the coordinate system at the reference point of the detector, the reference point 34 of the jig in FIG. 3 represented by $J(x_j, Y_J, z_J)$ in the coordinate system O-xyz at the reference point of the machine tool is represented by the following equation:

$$\begin{vmatrix} x'_{Jn} \\ y'_{JN} \\ z'_{Jn} \\ 1 \end{vmatrix} = M_{Tn}^1 \cdot \begin{vmatrix} x_J \\ y_J \\ z_J \\ 1 \end{vmatrix} \quad \text{equation (1)}$$

Figure 3:
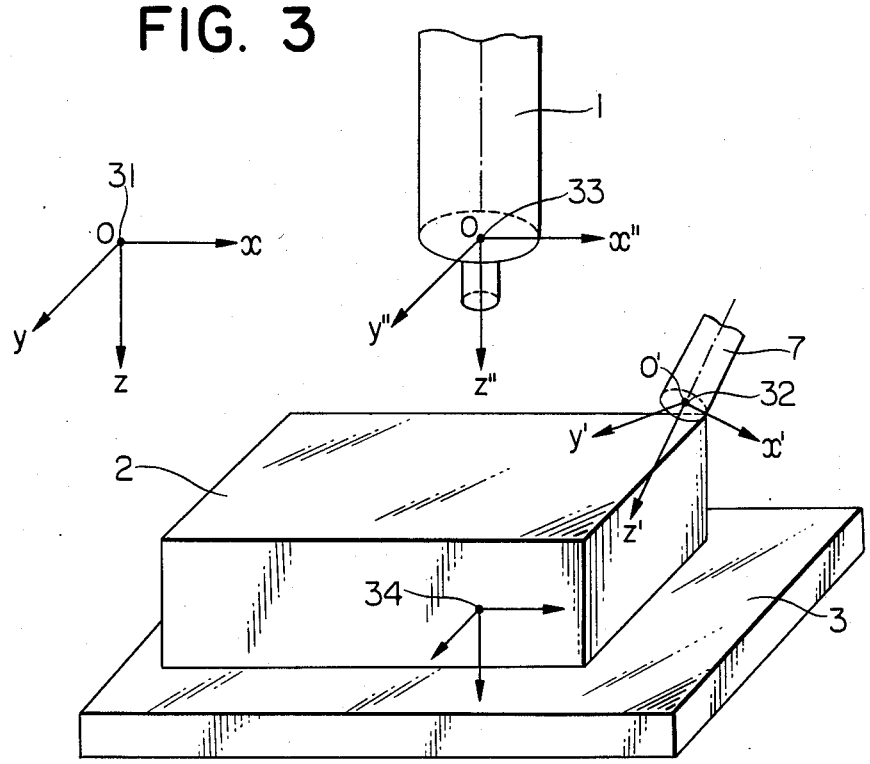
FIG. 3 is a perspective view showing coordinates for calculating the position.

On the other hand, according to the coordinate system $O''-x''y''z''$ at the reference point 33 of the machining head in FIG. 3, the coordinate system matrix corresponding to the coordinate system at the reference point 33 of the machining tool in FIG. 3 is represented by Mc. Then, according to the coordinate system $O''-x''y''z''$ at the reference point of the machining head, the coordinate (x,y,z) at a desired spatial point to be represented by the coordinate system 0-xyz is determined by the following equation:

$$\begin{vmatrix} x'' \\ y'' \\ z'' \\ 1 \end{vmatrix} = M_C^{-1} \cdot \begin{vmatrix} x \\ y \\ z \\ 1 \end{vmatrix} \quad \text{equation (2)}$$

In order to obtain the point such that the position of the jig seen from the maching head is the same as the spatial position corresponding to the reference point of the jig in view of the detector, the point may be calculated by the following equation:

$$\begin{vmatrix} x'' \\ y'' \\ z'' \\ 1 \end{vmatrix} = \begin{vmatrix} x'_{Jn} \\ y'_{Jn} \\ z'_{Jn} \\ 1 \end{vmatrix} \quad \text{equation (3)}$$

that is $$M_C^{-1} \cdot \begin{vmatrix} x \\ y \\ z \\ 1 \end{vmatrix} = M_{Tn}^{-1} \cdot \begin{vmatrix} x_J \\ y_J \\ z_J \\ 1 \end{vmatrix}$$

The reference point of the jig calculated by the above equation is represented by the following equation (4) according to the coordinate system in view of the reference point of the machining head.

$$\begin{vmatrix} x \\ y \\ z \\ 1 \end{vmatrix} = M_C \cdot M_{Tn}^{-1} \cdot \begin{vmatrix} x_J \\ y_J \\ z_J \\ 1 \end{vmatrix} \quad \text{equation (4)}$$

Also with regard to the attitude, the corresponding equation entirely equal to the equation (4) may be obtained with regard to the attitude as described below.

As stated above, the control system according to the present invention, at the time of the playback, first calculates when the positional relationship of the reference point 32 of the detector is the same as that of the reference point 34 of the jig, then calculates the position of the reference point 34 of the jig from the present position of the reference point 32 of the detector and provides commands to the driving unit 5 to move the jig so that the position of the machining head correponds to the position of the reference point 34 of the jig.

Thus, at the time of the playback, the machining head is maintained at the same position and attitude as those of the detector as detected at the time of the teaching, and then the workpiece is machined in accordance with the control command outputted from the control system 24 to the maching head.

Figure 4:
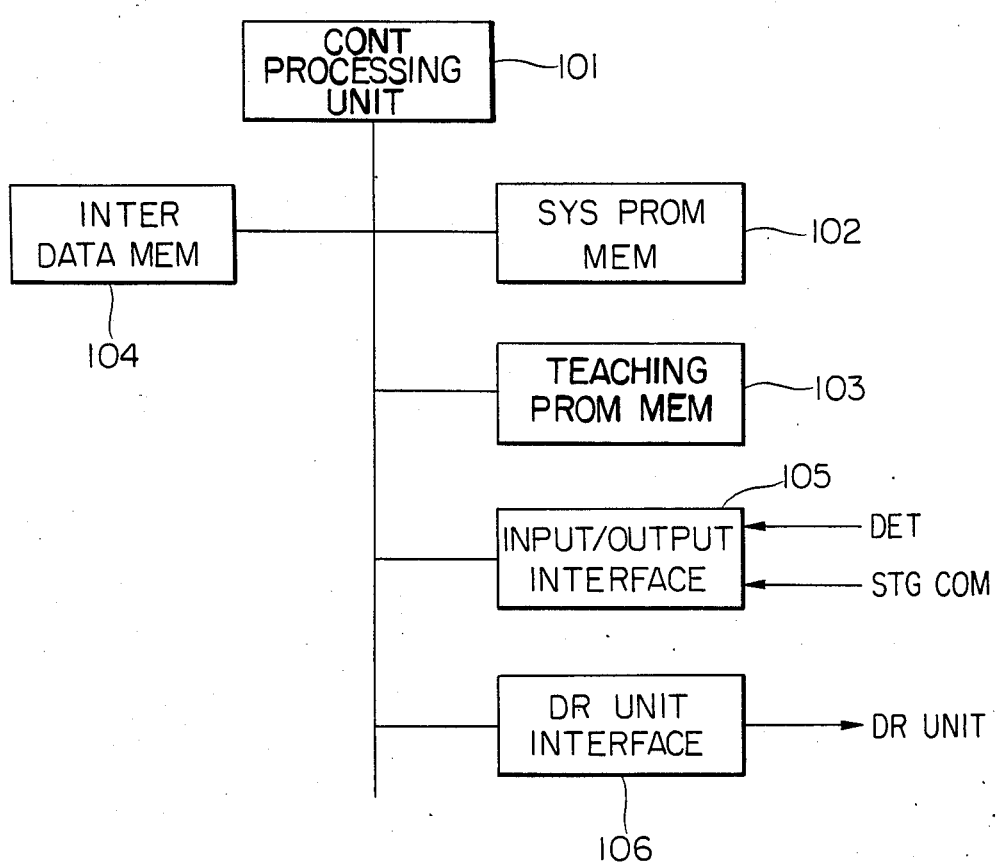
FIG. 4 is a block diagram of the configuration of a control device empolyed.

FIG. 4 is a schematic view of the construction of the above-described control device. In FIG. 4, numeral 101 designates a central processing unit (CPU), 102 designates a memory device for memorizing a system program to control the machining apparatus, and 103 designates a memory device for storing the position and the attitude of a detector, inputted under teaching condition, and the position and the attitude of the reference point of the jig calculated under the playback condition. A sequence program of the machining apparatus is also stored in the memory device. Numeral 104 designates an intermediate data memory device for temporarily memorizing intermediate data such as those in the interpolating calculation under the playback condition, 105 designates an interface unit for input/output signals out of the control device such as a detector or a memory command, and 106 designates an interface unit of a drive unit for interfacing a signal conversion to the drive unit.

Figure 5:
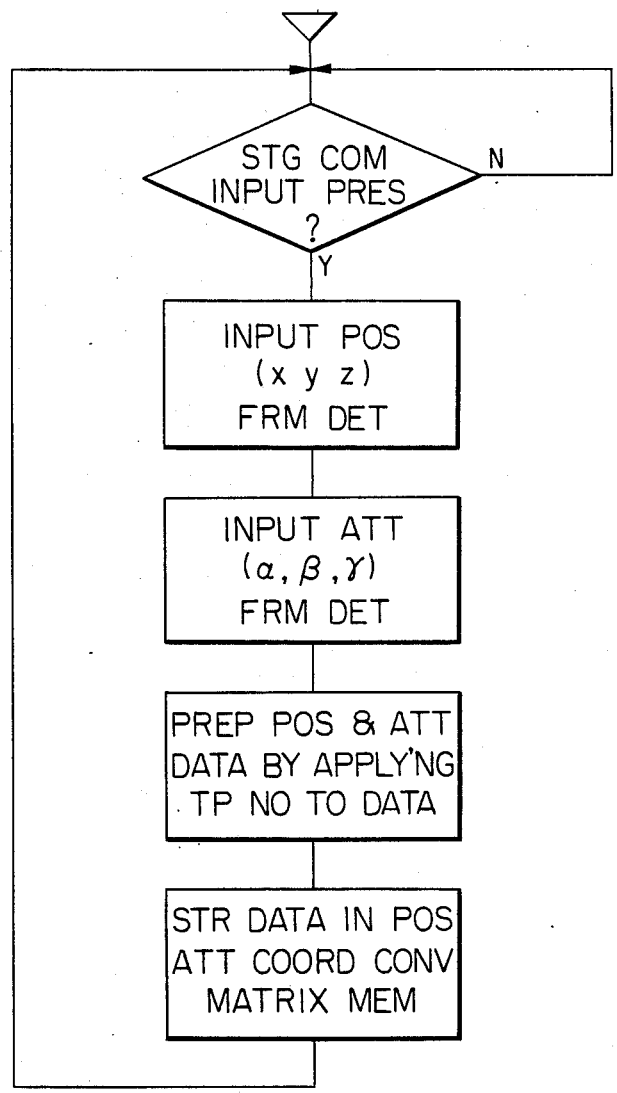
FIG. 5 is a flowchart of the apparatus under playback condition.
Figure 6:
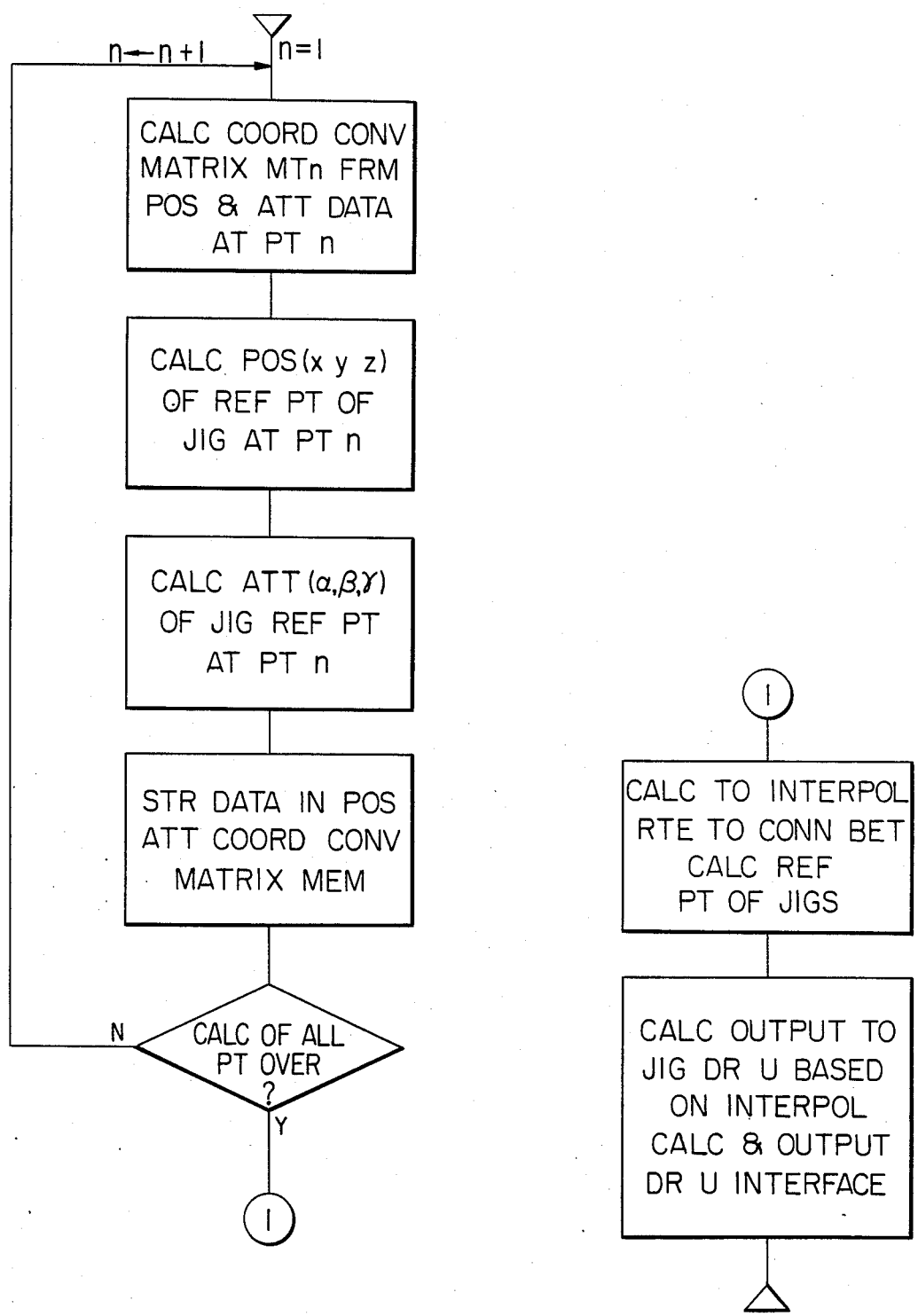
FIG. 6 is a diagram showing the data of position and attitude.
Figure 7:
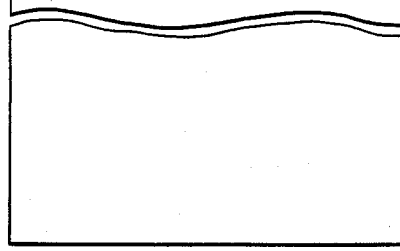
FIG. 7 is a diagram of data indicating the data of the position and the attitude.

FIG. 5 is a flowchart showing a processing flow under the teaching condition, FIG. 6 is a flowchart showing the processing flow under the playback condition, and FIG. 7 is a diagram of data indicating the data of the position and the attitude.

In the above embodiment, the machining head is stationary, but it may be movable, and the detector need not be manually manipulated but may be remotely controlled.

As has been stated above, the present invention provides a movable detector capable of detecting its own position and attitude and a control system capable of automatically converting the positional relationship of the detector with respect to the jig into that of the jig with respect to the machining head, thereby to facilitate the teaching of the machining points to the machining head without moving the jig and to eliminate the difficulty involved with the teaching.

Referring to FIGS. 4 and 5, as the flow chart in FIG. 5 indicates, the program stored in the system program memory 102 (FIG. 4) begins by asking the question, when the positioning of the detector is completed, "Is the storage command input present?" (STG COM INPUT PRES?), and, if yes (Y), the point storage command is inputted to the control processor unit 101 to input the data representing the position of the detector 7 (INPUT POS (xyz) FRM DET) at the reference point and the attitude of the detector 7 (INPUT ATT ($\alpha,\oplus,\gamma$) FRM DET) at the reference point. Then, the position and attitude data is prepared by applying the teaching program conversion matrix to the data (PREP POS & ATT DATA BY APPLY'NG TP No TO DATA) which is stored in the teaching program memory 103. The program loops and, when the positioning of the detector is completed at each point of the point-to-point sequence, the data will be inputted from the detector, prepared by the teaching program, and stored in the memory 103.

Referring to FIG. 6, this depicts the program sequence by which the coordinates of each of the position points $(x_n, y_n, z_n)$ of the detector and the attitude $(\alpha_n, \beta_n, \gamma_n)$ in the point-to-point teaching sequence stored in the memory according to the coordinates $O'-x'y'z'$ as a reference are converted to a second coordinates system O-xyz relating the machining head and the workpiece using coordinate conversion matrices. Thus, for each point n, n=1, the coordinates are calculated by applying $M_{Tn}$ from the position and attitude at point n (CALC COORD CONT MATRIX MTn FRM POS & ATT DATA AT PT n). In order to obtain each point such that the position of the jig seen from the machining head is the same as the spatial position corresponding to the reference point n of the jig relative to the detector, the position and attitude of the reference point n are calculated as indicated in FIG. 6 (CAL POS (xyz) OF REF PT OF JIG AT PT n) and (CALC ATT ($\alpha,\beta,\gamma$) OF JIG REF PT AT PT n). Then, the data n, n+1 is stored in memory (STR DATA IN POS ATT COORD CONT MATRIX MEM) for all points.

When the data for all points is stored (CALC OF ALL PT OVER?), a calculation is made to interpolate the route of the machining head/jig to connect between calculated reference points of the jig (CALC TO INTERPOL RTE TO CONN BET CALC REF PT OF JIGS) which is stored in the intermediate data memory device 104 and the output is then calculated for transfer to the jig drive unit based on the interpolation calculation and the results of this calculation are outputted to the drive unit interface 105 (CALC OUTPUT TO JIG DR U BASED ON INTERPOL CALC & OUTPUT DR U INTERFACE).

It is conventional machining practice with numerical controlled machine tools to simulate machine operation and store the data of the simulated maching operation developed during the simulation process. With the type of machine tool having a stationary machining head and a movable workpiece, the machining operation requires point-to-point movement of a workpiece relative to the stationary machining head. Where the simulation must be carried out using the machining apparatus itself, the workpiece is moved from point-to-point to carry out the complete machining operation and the locations of each are stored for playback to direct the movement of the workpiece relative to the machining head for executing the machining operation.

A problem is found in that it is difficult and time-consuming to carry out such a simulation process using the actual machining apparatus itself.

According to this invention, therefore, a movable detector is provided which is capable of detecting its own position and attitude according to a three axis coordinate system.

In carrying out the invention, the machining operation is simulated by moving the detector from point-to-point and varying its attitude in a simulation of the actual machining operation while maintaining the workpiece stationary. The stored data of the coordinates of each of the points in the point-to-point machining operation, as represented by the first coordinate system, is converted to a second coordinate system relating the machining head and the workpiece where the point-to-point locations of the workpiece during the machining operation relative to the machining head are represented by the originally stored data of the point-to-point locations of the detector and its attitude relative to the workpiece.

Therefore, the present invention provides a means for simulting the point-to-point machining operations without moving the workpiece and, thus, effectively overcomes the difficulties and time-consuming problems found with conventional apparatus.

What is claimed is:

1. A machining tool including a control means for storing position and attitude of a stationary machining head relative to a workpiece head by a movable jig at a sequence of desired points of a machining program so that the jig may be automatically moved to locate the workpiece to follow the sequence of stored points and attitudes of the machining program, said machine tool comprising:

a movable detector having means for determining its position and attitude relative to the workpiece independently from the machining head at each of the desired points;

control means connected to said detector means and having:
   memory means for storing a teaching program for moving the detector to each of the desired points of the machining program with an attitude at each point simulating the requisite relation between the machining head and the workpiece for a machining operations at that point; and
   memory means connected to receive data from said detector position and attitude determining means and for storing such data representing the position and attitude of the detector at each of the desired points according to coordinates of a first three axis coordinate system;

said control means including means for converting the stored data of the coordinates of each of the points according to the first coordinate system to a second three axis coordinate system relating the machining head and the workpiece;

a memory storing a playback program for controlling the position and attitude of the jig such that the machining head and jig are moved relative to each other to the desired points of the machining program according to the coordinates of the second coordinate system with an attitude at each point determined during the teaching program so that the machining program may be executed in accordance with the stored data; and a driving unit connected for driving the jig and operated by commands from the playback program in memory to execute the machining program.

2. A method for storing position and attitude of a stationary machining head relative to a workpiece held by a movable jig at a sequence of desired points of a machining program so that the jig may be automatically moved to locate the workpiece to follow the sequence of points and attitudes of the machining program comprising:

storing a teaching program for moving a detector to each of the desired points of the machining program with an attitude at each point simulating the requisite relation between the machining head and the workpiece for the machining operation at that point;

determining position and attitude of the detector relative to the workpiece independently from the machining head at each of the desired points;

receiving from the detector and storing in memory data representing its position according to coordinates of a first three axis coordinate system and its attitude at each of the desired points;

converting the stored data of the coordinates of each of the points according to the first coordinate system to a second three axis coordinate system relating the machining head and the workpiece;

storing a playback program in memory for controlling the position and attitude of the jig such that the machining head and jig are moved relative to each other to the desired points of the machining program with an attitude at each point determined by the detector during the teaching program so that the machining program may be executed in accordance with the stored data; and driving the jig by commands from the playback program in memory to execute the machining program.

* * * * *